Dec. 1, 1925.
E. A. JENSEN
1,563,494
DIRECTION SIGNAL FOR MOTOR VEHICLES
Filed Dec. 10, 1924 2 Sheets-Sheet 1
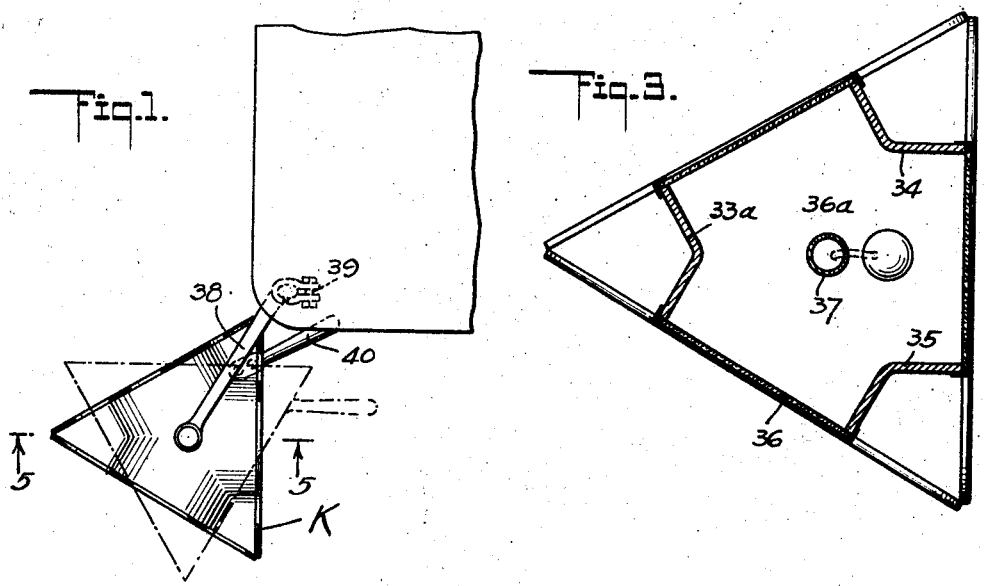
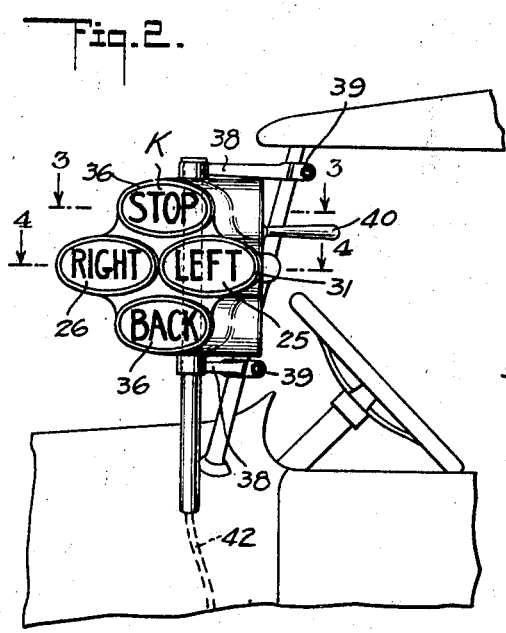
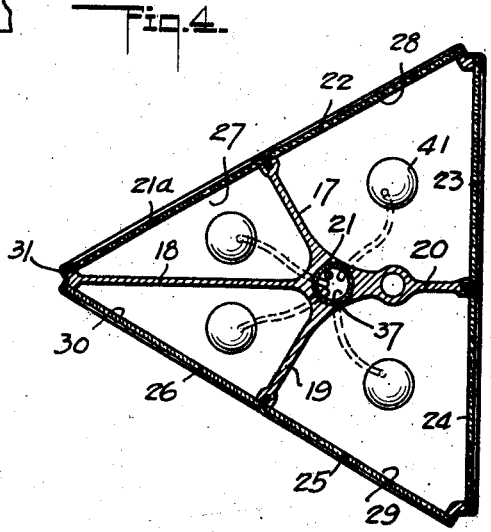
INVENTOR.
ELIAS A. JENSEN
BY
ATTORNEYS.

Dec. 1, 1925.  1,563,494
E. A. JENSEN
DIRECTION SIGNAL FOR MOTOR VEHICLES
Filed Dec. 10, 1924  2 Sheets-Sheet 2
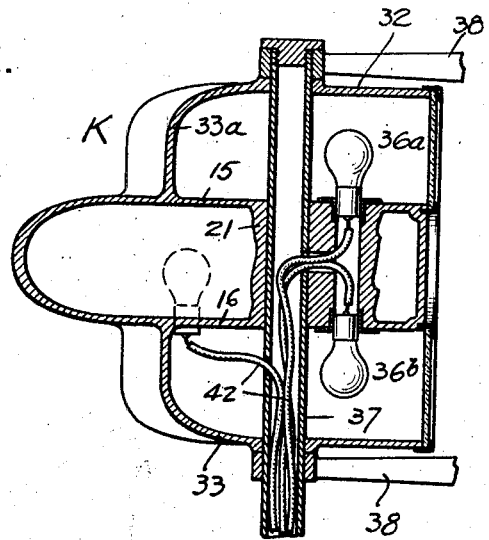
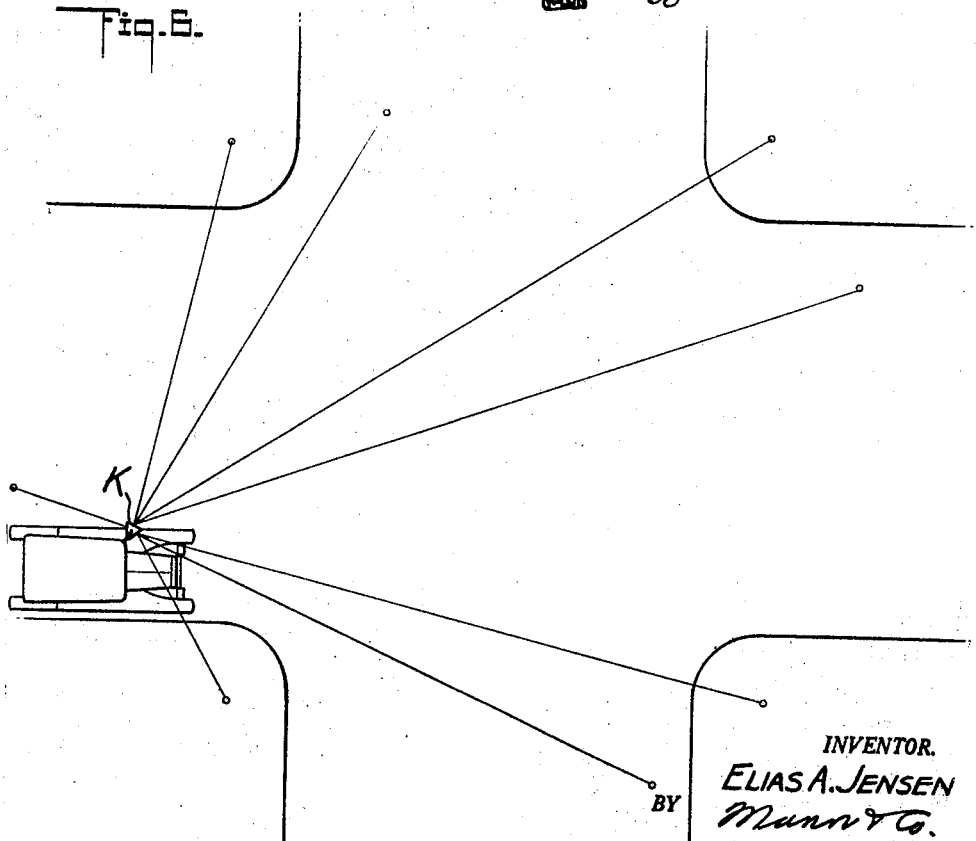
INVENTOR.
ELIAS A. JENSEN
BY
ATTORNEYS.

Patented Dec. 1, 1925.

1,563,494

UNITED STATES PATENT OFFICE.

ELIAS A. JENSEN, OF SANTA BARBARA, CALIFORNIA.

DIRECTION SIGNAL FOR MOTOR VEHICLES.

Application filed December 10, 1924. Serial No. 755,011.

*To all whom it may concern:*

Be it known that I, ELIAS A. JENSEN, a citizen of the United States of America, and a resident of Santa Barbara, in the county of Santa Barbara and State of California, have invented certain new and useful Improvements in Direction Signals for Motor Vehicles, of which the following is a specification.

My invention relates to direction signals for motor vehicles, and a purpose of my invention resides in the provision of a direction signal in which any one of a plurality of indications can be given to reveal the intentions of the driver, and in such manner as to be visible from the front, rear and to either side of the vehicle.

It is also a purpose of my invention to provide a direction signal comprising a casing of triangular form on each face of which are a plurality of indicating legends adapted to be selectively illuminated by the operator of the vehicle, the casing being mounted to occupy one position in which the legends are clearly visible from either side of the vehicle for the purpose of signaling traffic approaching the vehicle from intersecting streets, and another position in which the legends are clearly visible from the front and rear of the vehicle for signaling traffic approaching the vehicle from both the front and rear thereof.

I will describe only one form of direction signal embodying my invention and will then point out the novel features thereof in the claim.

In the drawings,

Figure 1 is a view showing in top plan one form of direction signal embodying my invention in applied position with respect to a motor vehicle;

Figure 2 is a view showing in side elevation the signal shown in Figure 1 and in applied position to the vehicle;

Figures 3 and 4 are horizontal sectional views taken on the lines 3—3 and 4—4, respectively, of Figure 2;

Figure 5 is a vertical sectional view taken on the line 5—5 of Figure 1;

Figure 6 is a plan view of a street intersection, showing a vehicle equipped with the signal shown in the preceding views and indicating the range of visibility of the signal.

Similar reference characters refer to similar parts in each of the several views.

Referring specifically to the drawings, my invention, in its present embodiment, comprises a casing designated generally at K and including horizontal partitions 15 and 16 of substantially triangular form and maintained in spaced parallel relation by vertical partitions 17, 18, 19 and 20, all of which latter radiate from a hub portion 21 which extends vertically between and connects the horizontal partitions. As illustrated to advantage in Figure 4, glass windows 21ª, 22, 23, 24, 25 and 26 co-operate with the several partitions to provide compartments in the casing. The partitions 17 and 18 and the window 21ª co-operate to provide a compartment 27. Partitions 17 and 20 and windows 22 and 23 co-operate to provide a compartment 28. The partitions 19 and 20, together with the windows 24 and 25, co-operate to provide a compartment 29. Partitions 18 and 19 co-operate with the window 26 to provide a compartment 30. Metal strips 31 are provided for securing the glass panels or windows in proper position, and these windows bear legends, the windows 22, 23 and 26 bearing the legend "Right" and the windows 21ª, 24 and 25 the legend "Left."

Above and below the partitions 15 and 16, the casing is provided with horizontal partitions 32 and 33, respectively, connected to the horizontal partitions 15 and 16 by vertical partitions 33ª, 34 and 35 arranged in triangular form and of V shape in cross section, as clearly shown in Figure 5. These several partitions co-operate to provide an upper compartment 36ª and a lower compartment 36ᵇ. These vertical partitions are spaced apart to provide windows in which are glass panels 36 bearing legends. The three upper panels 36 bear the legend "Stop" and the three lower panels bear the legend "Back". It is to be particularly noted that the windows 36 are presented to the three sides or faces of the casing in the same manner as the windows or panels 21ª, etc., above described.

As clearly shown in Figure 5, the casing as a unit is mounted for rotational movement in a conduit 37, the latter extending upwardly from the cowl of the vehicle, as clearly shown in Figure 2, and supported in upright position by means of brackets 38 secured to the windshield frame of a motor vehicle by means of clamps 39. Through the medium of a handle 40 fixed to the casing, the latter can be manually rotated by the operator of the vehicle to occupy the position shown in solid lines in Figure 1 or the position shown in dotted lines in the same figure.

For the purpose of selectively illuminating the legends on the windows, I have provided lamps 41 in the several compartments, to which current is supplied by means of conductors 42 extending from the lamps and into the conduit 37, it being understood that the conductors are connected to a suitable source of current (not shown) through a suitable switch (not shown), by which the selective illumination of the lamps may be effected to illuminate predetermined legends. For example, when the lamps for the compartments 28 and 30 are illuminated, the legends "Right" on all three sides of the casing will be illuminated, and when the lamps for the compartments 27 and 29 are illuminated the legend "Left" will be visible on all sides of the casing.

Further, when the lamp for the compartment 36ª is illuminated, the three legends "Stop" will be illuminated, and when the lamp for the lower compartment 36ᵇ is illuminated the legends "Back" will be illuminated.

From this operation, it will be clear that selective illumination of any group of legends can be effected and that when any one group is illuminated at least one legend will be visible from any side of the triangular casing, thereby permitting the indication to be viewed from any point forwardly of the vehicle and from the rear.

In practice, the single casing occupied the solid line position shown in Figure 1 when the vehicle is traversing the streets of a city or town where it is important that the signal be readily seen by the operators of vehicles approaching on intersecting streets, as well as vehicles following the vehicle equipped with the signal. By means of the handle 40, the signal can be swung to the dotted line position shown in Figure 1, wherein the faces of the signal occupy positions advantageous to the display of the legends from points both forwardly and rearwardly of the vehicle. The signal occupies this position when the vehicle is traversing highways, and it is important that the signal be clearly viewed from points ahead of and at the rear of the vehicle.

Although I have herein shown and described only one form of direction signals for motor vehicles embodying my invention, it is to be understood that various changes and modifications may be made therein without departing from the spirit of the invention and the spirit and scope of the appended claim.

I claim as my invention:

A direction signal for motor vehicles comprising a triangular casing provided on each face with a plurality of openings having transparent legend bearing panels, the casing having partitions dividing the intermediate portion into a plurality of compartments, certain of the panels being common to certain of the compartments and other partitions above and below the compartments providing a compartment above the first compartment and a compartment below the first compartment and the casing being positioned with respect to the vehicle to render the legends visible at any angle.

ELIAS A. JENSEN.